United States Patent [19]

Katz

[11] Patent Number: 4,808,689

[45] Date of Patent: Feb. 28, 1989

[54] PROCESS FOR PRODUCING POLYURETHANE POLYACETAL ELASTOMERS AND THE PRODUCT SO PRODUCED

[75] Inventor: Lawrence E. Katz, Orange, Conn.

[73] Assignee: Olin Corporation, Cheshire, Conn.

[21] Appl. No.: 124,319

[22] Filed: Nov. 23, 1987

[51] Int. Cl.$^4$ .............................................. C08G 18/00
[52] U.S. Cl. ....................................... 528/48; 528/58; 528/66
[58] Field of Search ............................... 528/48, 58, 66

[56] References Cited

PUBLICATIONS

Okada, Masahiko, Mita, Koji, and Jiroshi Sumitomo, "Polymerizability of Methyl Substituted 1,3-Dioxolanes," *Die Makromolekulare Chemie*, 176, pp. 859-872 (1975).

Wise, S., and J. J. Rocchio, "Binder Requirements for Low Vulnerability Propellants," *18th JANNAF Combustion Meeting*, vol. II, CPIA Publication 347, Oct. 1981, Jet Propulsion Laboratory, Pasadena, California, Oct. 19-23, 1981, pp. 305-320.

Chien, J. C. W., Farris, R., Lillya, C. P., Winter, H., and L. C. Dickinson, "Molecular Design of Thermoplastic Elastomeric LOVA Binder", University of Massachusetts, Amherst, MA, *ONR Workshop on Energetic Polymer and Processing Science*, CPIA Publication 405, Jun. 1984, Jul. 25-27, 1983, pp. 119-129.

J. C. W. Chien, "Synthesis of Polyacetal-Polyurethane Thermoplastic Elastomers as LOVA-Binders", University of Massachusetts, Amherst, MA *ONR Workshop on Energetic Polymer and Processing Science, CPIA Publication 405, Jun. 1984, Jul. 25-27, 1983, pp. 131-139*.

Baobei Xu, D. N. Khanna, C. Peter Lillya, and James C. W. Chien, "Structure-Property Relationships in Thermoplastic Elastomers III. Segmented Polyacetal-Polyurethanes" *Journal of Applied Polymer Science*, vol. 31, pp. 123-133 (1986).

Peters, S. T., Baroody, E. E., Boswell, R. F., Tompa, A. S., "Characterization of Thermoplastic Elastomers for Use in Gun Propellants", *Proceedings of the American Defense Preparedness Association, Chemical & Plastics Section of Chemical Division* Oct. 27-29, 1986, pp. 8-15.

Diab, M. A., Hseih, D. T., Lillya, C. P., and J. C. W. Chien, "Acidolysis of Poly-(4-Methyl-1,3-Dioxolane)," *Journal of Polymer Science: Part A: Polymer Chemistry*, vol. 25, pp. 945-954 (1987).

*Primary Examiner*—Maurice J. Welsh
*Attorney, Agent, or Firm*—Dale Lynn Carlson

[57] ABSTRACT

A process for making polyurethane polyacetal elastomers useful as binders in the fabrication of high energy explosives or propellants having low vulnerability to unwanted detonation. Also claimed is the elastomer product so produced.

24 Claims, No Drawings

PROCESS FOR PRODUCING POLYURETHANE POLYACETAL ELASTOMERS AND THE PRODUCT SO PRODUCED

FIELD OF THE INVENTION

The present invention relates generally to a process for making polyurethane polyacetal elastomers useful as binders in the fabrication of high energy explosives or propellants having low vulnerability to unwanted detonation. Also claimed is the elastomer product so produced.

BACKGROUND OF THE INVENTION

During the course of the last decade, the problem of unwanted detonation of high energy explosives and propellants for weaponry has been a major concern to the military. In an effort to reduce or eliminate the risk of unwanted detonation, various attempts have been made during the course of the last decade to incorporate elastomeric binders into the high energy explosive material to produce low vulnerability (so-called "LOVA") weaponry. The binders studied include, for example, elastomeric polyolefins, polyethers, thermoplastic acrylates and cellulose derivatives, and hydrocarbon thermoplastic elastomers. General background information on the testing of these types of materials, as well as a general discourse on the desired binder characteristics for LOVA propellants is given in a technical paper by S. Wise and J. J. Rocchio entitled "Binder Requirements for Low Vulnerability Propellants", and presented at the 18th JANNAF Combustion Meeting, Volume II at the Jet Propulsion Laboratory in Pasadena, Calif. on Oct. 19 to 23, 1981, and reproduced in CPIA publication 347, Chemical Propulsion Information Agency, pp. 305–319, (October, 1981).

Desired binder characteristics include thermal stability against decomposition at a high temperature of at least about 210° C., processability by melt methods at temperatures below about 100° C., a low glass transition temperature of less than about −65° C., and the ability to depolymerize endothermically when exposed to the acidic decomposition products of energetic materials in propellants and explosives. In addition, there are several other preferred characteristics of binders, including the ability to maintain desired physical properties, including the above binder characteristics, even when loaded with up to 80 percent or higher of energetic additives, as well as the ability ideally to avoid phase changes over a temperature range of between about −60° C. and about 60° C., the ability to maintain binder integrity during elongation of up to 400 percent, and the ability to provide a high oxygen content and thereby assist in the clean burning of the explosive's or propellant's high energy component.

Recent technical papers on this subject were presented at the "ONR Workshop on Energetic Polymer and Processing Science" given in Chestertown, Md. on July 25–27, 1983 and reproduced in CPIA Publication 405, Chemical Propulsion Information Agency (June, 1984). In a paper reproduced at pages 131–139 of CPIA Publication 405, J. C. W. Chien generally describes the "Synthesis of Polyacetal-Polyurethane Thermoplastic Elastomers as LOVA-Binders" by end-capping methylene(bis-phenyl-isocyanate (MDI) or toluene diisocyanate (TDI) to form a prepolymer, and then chain-extending this prepolymer with a monomer which is either bis-(2-hydroxyethyl) terephthalamide or bis-(2-hydroxyethylisophthalamide). The testing of these types of polyurethane-polyacetals formed by reacting an isocyanate-terminated prepolymer with a monomer is disclosed in an article by S. T. Peters et al entitled "Characterization of Thermoplastic Elastomers for Use in Gun Propellants" from *Proceedings of the American Defense Preparedness Association; Chemical & Plastics Section of the Chemical Systems Division*, held Oct. 27–29, 1986, Long Beach, Calif., pp. 8–15. Table I at page 12 of this article discloses, in Samples 17 through 29 of the table, physical property data on these types of polymers. These samples show temperature stability, when loaded with 50 percent of RDX in a binder/propellant formulation, up to a decomposition temperature peak of between 198° C. and 210° C., as compared to the decomposition temperature of RDX alone of 220° C. This difference in decomposition temperature between the pure RDX and the RDX/binder mixtures indicates some incompatability between RDX and these binders.

This S. T. Peters et al article also discloses in TABLE I, samples 21 and 22, the testing of two polyacetal polyurethane elastomers of another type. This other type is apparently fabricated by reacting an isocyanate-terminated prepolymer, made using either TDI or MDI as the isocyanate component of the prepolymer, with a polyurethane and chain-extended with N,N'-(bis-2-hydroxyethyl) isophthalamide. These two samples are described in this article as exhibiting undesirable decomposition temperature peaks of 191° C. and 195° C., respectively, in admixture with a 50 percent loading of RDX. In addition, these two polymers are disclosed as having poor processability characteristics due to unacceptably high viscosities. In view of the above, it should be readily apparent that new processes for fabricating polyurethane polyacetal elastomers characterized by improved physical properties would be highly desired by the military, particularly the propellant and explosives communities. Heretofore, such processes were not known to the knowledge of the present inventor.

SUMMARY OF THE INVENTION

In one aspect, the present invention relates to a process for producing a polyurethane polyacetal elastomer comprising:

(a) reacting a dihydroxy-terminated polyacetal homopolymer with an alkylene disocyanate in the presence of a urethane-forming catalyst in a reaction to produce an isocyanate-terminated prepolymer, said homopolymer having a weight average molecular weight of between about 20,000 and about 50,000 as measured against a polystyrene standard by gel permeation chromatography and being produced by polymerizing a 4-lower alkyl substituted-1,3-dioxolane, said reaction employing between about 55 mole percent and about 70 mole percent of said alkylene diisocyanate based upon the total amount of said alkylene diisocyanate and said homopolymer employed, and reacting said isocyanate-terminated prepolymer with a dihydroxy-terminated polyacetal copolymer in the presence of a solvent and a urethane-forming catalyst to provide said elastomer, said copolymer having a weight average molecular weight of between about 100,000 and about 200,000 as measured against a polystyrene standard by gel permeation chromatography and being the reaction product of a formaldehyde-providing compound and 1,3-dioxolane, said copolymer being employed in an amount of between about 30 and about 50 mole percent based upon the total amount of said copolymer and said isocyanate-terminated prepolymer employed.

In another aspect, the present invention relates to a process for producing a polyurethane polyacetal elastomer comprising:

(a) reacting a dihydroxy-terminated polyacetal copolymer with an alkylene diiisocyanate in the presence of a urethane-forming catalyst in a reaction to produce an isocyanate-terminated prepolymer, said copolymer having a weight average molecular weight of between about 100,000 and about 200,000 as measured against a polystyrene standard by gel permeation chromatography and being the reaction product of a formaldehyde-providing compound and 1,3-dioxolane, said reaction employing between about 55 mole percent and about 70 mole percent of said alkylene diisocyanate based upon the total amount of said alkylene diisocyanate and said copolymer employed, and (b) reacting said isocyanate-terminated prepolymer with a dihydroxy-terminated polyacetal homopolymer in the presence of a solvent and a urethane-forming catalyst to provide said elastomer, said homopolymer having a weight average molecular weight of between about 20,000 and about 50,000, as measured against a polystyrene standard by gel permeation chromatography and being produced by polymerizing a 4-lower alkyl substituted-1,3-dioxolane, said homopolymer being employed in an amount of between about 30 and about 50 mole percent based upon the total amount of said homopolymer and said isocyanate-terminated prepolymer employed.

In still another aspect, the present invention relates to the elastomers produced by the above processes.

DETAILED DESCRIPTION OF THE INVENTION

It has now been surprisingly discovered in accordance with the present invention that a novel, two-step process can be employed to provide polyurethane polyacetal elastomers for use in propellants and explosives. The elastomers produced by the above process exhibit improved physical properties relative to those of the above-discussed prior art.

In the first step of the process of a preferred embodiment of the process of the present invention, a dihydroxy-terminated polyacetal homopolymer (the so-called "soft segment" moiety) is reacted with an alkyldiisocyanate to provide an isocyanate-terminated prepolymer. This isocyanate-terminated prepolymer preferably contains an average of between two and five (more preferably between two and four) molecules of polyacetal homopolymer and an average of between three and five molecules of diisocyanate, per molecule of prepolymer.

In the second step of this preferred process, the isocyanate-terminated prepolymer is reacted with a dihydroxy-terminated polyacetal copolymer (the so-called "hard segment" moiety).

Although not wishing to be bound by any particular theory, it is believed by the present inventor that the excellent physical properties of the elastomers produced by the process of the present invention are attributable, at least in part, to the nature of the isocyanate utilized. Unlike the arylene isocyanates, such as MDI or TDI, disclosed in the prior art methods of producing polyurethane polyacetal elastomers, the present process utilizes, an alkyldiisocyanate. The alkylene diisocyanate provides the advantage of enhanced elasticity to the elastomer as compared to the elasticity provided by TDI or MDI.

The alkylene diisocyanates useful in the present invention include alkyl, cycloalkyl, and alkylcycloalkyl diisocyanates. Illustrative alkylene diisocyanate can be represented by the empirical formula:

$$R(NCO)_2$$

wherein R is a divalent aliphatic group having between 2 and 20 carbon atoms; a divalent cycloalkyl group havin between 3 and 9 carbon atoms; or a divalent alkylcycloalkyl having between 5 and 20 carbon atoms. Typical examples of suitable organic diisocyanates include aliphatic diisocyanates such as: ethylene, trimethylene, tetramethylene, pentamethylene, hexamethylene, heptamethylene, up to icosamethylene; 1,2-propylene, 1,3-butylene, 2,3-butylene, 1,3-butylene, ethylidine, and butylidine diisocyanates; cycloalkylene diisocyanates such as 1,3-cyclopentene, 1,4-cyclohexylene, 1,2-cyclohexylene diisocyanate; cycloalkane diisocyanates such as cyclopentyl, cyclohexyl, and cycloheptyl diisocyanate; alkylcycloalkyl diisocyanates such as methylcyclopentyl, methylcyclohexyl, dimethylcyclohexyl, isophorone diisocyanate.

The polyacetal homopolymer soft segment useful in the present invention can be prepared by known reactions. In accordance with a preferred reaction, a 4-lower alkyl substituted-1,3-dioxolane (preferably 4-methyl-1,3-dioxolane) is reacted with boron trifluoride etherate at a reaction temperature of between about −10° C. and about −20° C., preferably between about −15° C. and about −20° C., for a reaction time of at least about 8 hours, preferably at least 16 hours, although the reaction can take as long as 70 hours or longer depending upon the specific reactants and reactor conditions. The reaction is then quenched, and the resulting product is washed, hydrolyzed, and dried to provide the desired polyacetal homopolymer. This type of reaction is described in further detail in a technical article by M. Okada et al entitled "Polymerizability of Methyl Substituted 1,3-Dioxolanes" appearing in Die Makromolecular Chemie, Vol. 176, pp. 859–872 (1975), incorporated herein by reference. The hydrolysis step serves to cleave any hemiacetal terminal groups and replace them with alcohol groups (which are more reactive). The desired homopolymer generally has a weight average molecular weight of between about 20,000 and about 50,000 (preferably between about 30,000 and about 40,000) as measured by gel permeation chromatography against a polystyrene standard.

An alternate (and less preferred) preparation of the polyacetal homopolymer involves the reaction of the 4-lower alkyl substituted (e.g., 4-methyl or 4-ethyl substituted) with trifluoromethanesulfonic acid at about −78° C. for at least about two days, followed by reaction quenching, hydrolysis, washing, and drying of the product. The very low temperature of this reaction makes it commercially impractical.

The polyacetal copolymer useful in the present invention is the reaction product of 1,3-dioxolane with a formaldehyde-providing compound. Representative formaldehyde-providing compounds include, for example, trioxane, formaldehyde, para-formaldehyde, and combinations thereof. This reaction is generally conducted at between about 40° C. and about 70° C., preferably between about 50° C. and about 60° C., for up to a day or more, preferably between about 3 and about 24 hours to provide the desired copolymer. This reaction is described in more detail in a technical article by M. Inoue entitled "Crystallization and Melting of Copolymers" appearing in *Journal of Applied Polymer Science*, Vol. 8, pp. 2225–2238 (1964), incorporated herein by reference. The desired copolymer generally has a weight average molecular weight of between about 100,000 and about 200,000 (preferably between about 100,000 and about 150,000) as measured by gel permeation chromatography against a polystyrene standard.

The production of the polyurethane polyacetal elastomer is carried out by one of the two-step processes described earlier. The preferred process involves the reaction in the first step of the dihydroxy-terminated polyacetal homopolymer with alkyldiisocyanate to form an isocyanate-terminated prepolymer, followed by a reaction in the second step of this isocyanate-terminated prepolymer with the dihydroxy-terminated polyacetal copolymer to provide the desired polyurethane polyacetal elastomer. Each step of this two-step reaction is generally carried out at a reaction temperature independently selected to be within about 25° C. and about 100° C., preferably between about 60° C. and about 70° C. The second step reaction is carried out in the presence of a solvent, preferably a halohydrocarbon solvent, and the first step reaction is preferably also conducted in the presence of a solvent, conveniently also a halohydrocarbon solvent. Typical solvents would include tetrachloroethane, methylene chloride, chloroform, and trichloroethane. The preferred solvent is chloroform. Other useful solvents would include non-reactive organics in which the reactants are soluble.

Each reaction in the two-step process is conducted in the presence of a urethane-forming catalyst, such as dibutyltin dilaurate, dibutyltin dithiolaurate, tertiary amines, uranyl acetate, triphenylbismuth/maleic anhydride, and the like. The preferred catalyst is dibutyltin dilaurate.

Each reaction in the two-step process is preferably conducted with stirring in an inert reactor such as a stainless steel or glass-lined reactor. Each reaction is conducted over a period of at least about four hours, preferably at least about eight hours.

In an alternative (and less preferred) process of the invention, the dihydroxy-terminated polyacetal copolymer is first reacted with the alkyldiisocyanate to form an isocyanate-terminated prepolymer, and this prepolymer is reacted with the dihydroxy-terminated polyacetal homopolymer to provide a polyurethane polyacetal elastomer. This isocyanate-terminated prepolymer preferably contains an average of between two and five (more preferably between two and four) molecules of polyacetal copolymer and an average of between three and five molecules of diisocyanate. This less preferred process provides an elastomer having a hard-segment center and soft-segment terminal groups.

The polyacetal elastomers produced in accordance with the process of the present invention are useful as LOVA binders in high-energy propellants and explosives. The elastomers provide the desirable properties of high elongation (as illustrated in the examples below), thermal stability against decomposition up to a temperature of at least about 210° C., good compatability with high-energy materials such as RDX, a low glass transition temperature of less than −45° C., and good melt processability. In addition, the elastomers undergo no phase changes between about −45° C. and about 80° C. as determined by Differential Scanning Calorimetry, will depolymerize endothermically under acid conditions to help stabilize the high-energy component of the propellant or explosive, and are clean burning, thereby reducing or eliminating any smoke trail or trace during binder ignition.

The following example is intended to illustrate, but in no way limit the scope of, the present invention.

EXAMPLE 1

(I) Preparation of 4-Methyl-1,3-Dioxolane (Starting Material for the Polyacetal Homopolymer)

To a one liter flask was added 25.0 g Dowex 50X-8-200 (air dried), 228.0 g (3.0 moles) 1,2-propanediol and 60.0 g (2.0 moles) paraformaldehyde. The mixture was heated and stirred at 100° to 110° C. while collecting distillate. As the reaction progressed, portions of 152.0 g (2.0 mole) 1,2-propane diol and 60.0 g (2.0 mole) paraformaldehyde were added as needed to keep the product distilling. After addition of ten 2 molar portions, the product was separated from co-distilled water, dried over potassium hydroxide, and refluxed with sodium. The product was distilled at 85° to 88° C. to provide the titled product in a 70 mole percent yield.

(II) Preparation of Poly-4-Methyl-1,3-Dioxolane (a Polyacetal Homopolymer)

(a) Less Preferred Method

To 559.8 g (6.35 mole) 4-methyl-1,3dioxolane, cooled to 3° C., was added 12.0 g (0.08 mole) trifluoromethane sulfonic acid and the solution stirred. The solution was decanted into test tubes, capped, and cooled at −78° C. for two days. A quench solution was made from 1680 ml toluene, 105 ml water, 15.4 g trimethylamine hydrochloride, and 18.1 potassium hydroxide. The aqueous layer was phased off and the solution cooled in an ice bath. To this was added the cold test tubes (cracked) with vigorous stirring. After 1 and ½ hours the solution was filtered, an aqueous solution of 5 percent potassium hydroxide added, and the solution boiled. The aqueous layer was separated and the toluene solution washed with five ½ liter portions of water each time bringing it to a boil. Excess water was azeotroped off and toluene removed via rotary evaporation under aspiration. A yield of 379.5 g residue which was dried at 110° C. under vacuum to give 376.8 g (67.3 percent) polymer.

The polymer was characterized via Gel Permeation Chromatography, which showed it had a molecular weight of 35,291 versus a polystyrene standard (using a linear ULTRASTRYAGEL column and chloroform as a solvent).

(b) More Preferred Method

To 352.7 g (4.0 mole) 4-methyl-1,3-dioxolane, cooled to 0° C. under nitrogen was added 5.16 g (0.036 mole) boron trifluoride etherate with stirring. The flask was capped and stored in a freezer (−16° C.) for 68.5 hours. A quench solution was prepared by mixing 6.89 g (0.072 mole) trimethylamine hydrochloride in 50 ml of water, 500 ml methylene chloride at 0° C. and adding 4.0 g (0.071 mole) potassium hydroxide. The quench solution was phased and the methylene chloride layer stirred at 0° C. while adding the polymer reaction mixture. The reaction vessel was rinsed with three 100 ml portions of methylene chloride which were added to the other solution. The combined solution was washed with four 500 ml portions of water, phased, and rotary evaporated. The residue was taken up in 500 ml toluene, 500 ml of one percent potassium hydroxide was added, and the mixture was refluxed for one hour. The mixture was phased, the toluene solution washed with several portions of water, and water azeotroped off. Rotary evaporation of the toluene yielded 171.5 g (48.6 percent) of polymer.

(III) Preparation of Trioxane/1,3-Dioxolane (a Polyacetal Co-Polymer)

In a 4 liter flask 250.0 g (2.78 mole) trioxane, 308.7 g (4.17 mole) 1,3-dioxolane and 500 ml cyclohexane was stirred. The mixture was cooled to 7° C. and 9.80 g (0.07 mole) boron trifluoride etherate added. After about ¼ hour the reaction set up and was allowed to stand overnight. To this was added 250 ml triethylamine and the gummy mass allowed to stand two hours and stirred ½ hour. The amine was decanted, 700 ml methanol added, and the mixture stirred. The methanol was removed via filterstick and the methanol wash process repeated. To the mixture was added 175 ml triethylamine, 350 ml ethanol, and 2500 ml water. The mixture was refluxed for four hours and stirred while cooling to room temperature. After standing overnight, the solution was decanted and the gummy residue washed with 700 ml portions of methanol. The solid was filtered, washed with methanol and dried under vacuum at 60° C. to give 333.4 g (59.6 percent) polymer.

A portion of this was fractionated from methylene chloride to give about an 80 percent recovery of polymer. Gel Permeation Chromatography showed a molecular weight of 138,701 versus a polystyrene standard (using a linear ULTRASTRYAGEL column and chloroform as a solvent).

(IV) Preparation of Polyurethanepolyacetal Elastomer

In a 100 ml resin kettle, equipped with a mechanical stirrer, was placed 47.1 g (0.0097 mole) poly-4-methyl-1,3-dioxolane, 2.50 g (0.0149 mole) 1,6-diisocyanatohexane, and 102 g of 1,1,2,2-tetrachloroethane. The solution was stirred with heating at 64° C. and 0.22 g (0.00035 mole) dibutyltin dilaurate added.

After 10.8 hours this solution was poured into a previously made solution of 18.5 g (0.0049 mole) trioxane/1,3-dioxolane co-polymer and 37.2 g of 1,1,2,2-tetrachloroethane (at 65° C.). The combined solutions were stirred at 65° C. for two days, then 0.10 g (0.00016 mole) dibutyltin dilaurate was added and the reaction was continued for an additional day. Petroleum ether was added to the reaction mixture and the solvent layer decanted away from the polymer. After washing with more petroleum ether, the process was repeated and the polymer dried at 50° C. under vacuum (0.1 mm) several days. A yield of 57.6 g was obtained. Gel Permeation Chromatography of the polymer showed a weight average molecular weight of 166,783 versus a polystyrene standard using a linear ULTRASTRYAGEL column and chloroform as a solvent. Note that this molecular weight is a weight average using a specific (polystyrene) GPC standard and cannot necessarily be calculated by merely adding the GPC standard molecular weights of the component segments comprising the elastomer. The NMR (proton), run in deuterated chloroform, indicated between three and four soft segments per hard segment. DSC showed a glass transition point about −45° C. and a melting point at 86.5° C. (run under inert atmosphere). This melting point is considered ideally suited for extrusion melt processing in contrast to typical prior art polyurethane polyacetal binders having higher melting points.

(V) Physical Property Testing of Polyurethane Polyacetal Elastomer

Elastomers prepared in accordance with preparations (I) through (IV) above were tested to determine percent elongation and tensile strength in accordance with ASTM D 638-84. The test results are presented in TABLE I below. Sample A represents the average of duplicate tests of these physical properties on one batch of elastomer, and the data on Sample B represents the average of four tests on another batch of elastomer.

TABLE I

| | Physical Properties of Polyurethane Polyacetals | |
|---|---|---|
| Sample # | Percent Elongation, ASTM D 638-84 Section 11.2 | Tensile Strength in psig, ASTM D 638-84 Section 11.1 |
| A | 165.0 | 11.0 |
| B | 57.5 | 153.035 |

The results as presented in TABLE I illustrate that a wide range of physical properties for the elastomers is achievable by appropriate adjustment of processing parameters.

Elemental analysis was also performed on Samples A and B. These results are given in TABLE II.

TABLE II

| Elemental Analysis of Polyurethane Polyacetals | | | |
|---|---|---|---|
| Sample # | % Carbon | % Hydrogen | % Nitrogen |
| A | 51.01 | 8.52 | 0.72 |
| B | 51.60 | 8.63 | 0.69 |

In addition to the above tests, the heat of combustion was measured for Sample A by bomb calorimetry and found to be 5,708 calories per gram. Sample A burned with a clean blue flame which is an advantageous property for propellant binders.

What is claimed is:

1. A process for producing a polyurethane polyacetal elastomer comprising:

(a) reacting a dihydroxy-terminated polyacetal homopolymer with an alkylene diisocyanate in the presence of a urethane-forming catalyst in a reaction to produce an isocyanate-terminated prepolymer, said homopolymer having a weight average molecular weight of between about 20,000 and about 50,000 as measured against a polystyrene standard by gel permeation chromatography and being produced by polymerizing-a 4-lower alkyl substituted-1,3-dioxolane, said reaction employing between about 55 mole percent and about 70 mole percent of said alkylene diisocyanate based upon the total amount of said alkylene diisocyanate and said homopolymer employed, and (b) reacting said isocyanate-terminated prepolymer with a dihydroxy-terminated polyacetal copolymer in the presence of a solvent and a urethane-forming catalyst to provide said elastomer, said copolymer having a weight average molecular weight of between about 100,000 and about 200,000 as measured against a polystyrene standard by gel permeation chromatography and being the reaction product of a formaldehyde-providing compound and 1,3-dioxolane, said copolymer being employed in an amount of between about 30 and about 50 mole percent based upon the total amount of said copolymer and said isocyanate-termninated prepolymer employed.

2. The process of claim 1 wherein said formaldehyde-providing compound is selected from the group consisting of trioxane, formaldehyde, para-formaldehyde and combinations thereof.

3. The process of claim 1 wherein said solvent is a halohydrocarbon.

4. The process of claim 3 wherein said halohydrocarbon is selected from the group consisting of tetrachloroethane, chloroform, trichloroethane, and mixtures thereof.

5. The process of claim 1 wherein the reaction of step (a) additionally employs a solvent.

6. The process of claim 5 wherein said solvent is a halohydrocarbon.

7. The process of claim 6 wherein said halohydrocarbon is selected from the group consisting of tetrachloroethane, chloroform, trichloroethane, and mixtures thereof.

8. The process of claim 1 wherein said urethane catalyst is dibutyltin dilaurate.

9. The process of claim 1 wherein said urethane catalyst is employed in an amount of between about 0.1 weight percent and about 5 weight percent, based on the total amount of said polyacetal homopolymer or polyacetal copolymer employed.

10. The process of claim 1 wherein the reactions of step (a) and step (b) are individually selected within a temperature range of between 25° C. and 90° C.

11. The process of claim 1 wherein said alkylene diisocyanate is hexamethylene diisocyanate.

12. The elastomer produced by the process of claim 1.
13. The elastomer produced by the process of claim 2.
14. The elastomer produced by the process of claim 3.
15. The elastomer produced by the process of claim 4.
16. The elastomer produced by the process of claim 5.
17. The elastomer produced by the process of claim 6.
18. The elastomer produced by the process of claim 7.
19. The elastomer produced by the process of claim 8.
20. The elastomer produced by the process of claim 9.
21. The elastomer produced by the process of claim 10.
22. The elastomer produced by the process of claim 11.

23. A process for producing a polyurethane polyacetal elastomer comprising:
(a) reacting a dihydroxy-terminated polyacetal copolymer with an alkylene diisocyanate in the presence of a urethane-forming catalyst in a reaction to produce an isocyanate-terminated prepolymer, said copolymer having a weight average molecular weight of between about 100,000 and about 200,000 as measured against a polystyrene standard by gel permeation chromatography and being the reaction product of a formaldehyde-providing compound and 1,3-dioxolane, said reaction employing between about 55 mole percent and about 70 mole percent of said alkylene diisocyanate based upon the total amount of said alkylene diisocyanate and said copolymer employed, and
(b) reacting said isocyanate-terminated prepolymer with a dihydroxy-terminated polyacetal homopolymer in the presence of a solvent and a urethane-forming catalyst to provide said elastomer, said homopolymer having a weight average molecular weight of between about 20,000 and about 50,000, as measured against a polystyrene standard by gel permeation chromatography and being produced by polymerizing a 4-lower alkyl substituted-1,3-dioxolane, said homopolymer being employed in an amount of between about 30 and about 50 mole percent based upon the total amount of said homopolymer and said isocyanate-terminated prepolymer employed.

24. The elastomer produced by the process of claim 23.

* * * * *